(12) United States Patent
Hearnes, II

(10) Patent No.: US 8,412,559 B2
(45) Date of Patent: Apr. 2, 2013

(54) SYSTEMS AND METHODS FOR IMPROVED CALCULATION OF COEFFICIENT FOR PRICE SENSITIVITY

(75) Inventor: Warren Eastman Hearnes, II, Lilburn, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 175 days.

(21) Appl. No.: 13/009,112

(22) Filed: Jan. 19, 2011

(65) Prior Publication Data

US 2012/0185347 A1   Jul. 19, 2012

(51) Int. Cl.
*G06Q 30/00* (2012.01)
*G06Q 10/00* (2012.01)

(52) U.S. Cl. .................. 705/7.31; 705/7.29; 705/7.35

(58) Field of Classification Search .............. 705/7.31, 705/7.29, 7.35
See application file for complete search history.

(56) References Cited

U.S. PATENT DOCUMENTS

| | | | |
|---|---|---|---|
| 4,862,357 A | 8/1989 | Ahlstrom et al. |
| 5,021,953 A | 6/1991 | Webber et al. |
| 5,189,606 A | 2/1993 | Burns et al. |
| 5,191,523 A | 3/1993 | Whitesage |
| 5,249,120 A | 9/1993 | Foley |
| 5,331,546 A | 7/1994 | Webber et al. |
| 5,361,201 A | 11/1994 | Jost et al. |
| 5,377,095 A | 12/1994 | Maqeda et al. |
| 5,404,291 A | 4/1995 | Kerr et al. |
| 5,546,564 A | 8/1996 | Horie |
| 5,615,109 A | 3/1997 | Eder |
| 5,652,867 A | 7/1997 | Barlow et al. |
| 5,710,887 A | 1/1998 | Chelliah et al. |
| 5,754,543 A | 5/1998 | Seid |
| 5,793,632 A | 8/1998 | Fad et al. |
| 5,822,736 A | 10/1998 | Hartman et al. |
| 5,832,453 A | 11/1998 | O'Brien |
| 5,918,209 A | 6/1999 | Campbell et al. |
| 5,933,813 A | 8/1999 | Teicher et al. |
| 5,946,661 A | 8/1999 | Rothschild et al. |
| 5,953,707 A | 9/1999 | Huang et al. |
| 5,960,407 A | 9/1999 | Vivona |
| 5,960,417 A | 9/1999 | Pan et al. |
| 5,966,694 A | 10/1999 | Rothschild et al. |

(Continued)

FOREIGN PATENT DOCUMENTS

| | | |
|---|---|---|
| DE | 19623285 A1 | 12/1997 |
| JP | 4 11120246 | 10/1997 |
| WO | WO99/01822 | 1/1999 |
| WO | WO00/52605 | 9/2000 |

OTHER PUBLICATIONS

Wollmer, "An Airline Seat Management Model for a Single Leg Route when Lower Fare Classes Book First", Operations Research, vol. 40, No. 1, Jan.-Feb. 1992.
Anthes, Stat Tool Weeds Out Bid-Rigging Companies, Computerworld, vol. 27, Jul. 1997.

(Continued)

*Primary Examiner* — Kevin Flynn
(74) *Attorney, Agent, or Firm* — Alston & Bird, LLP

(57) ABSTRACT

Various embodiments of the present invention provide systems, methods, and computer program products for calculating a sufficiently accurate coefficient for price sensitivity to use in a target pricing system. In general, various embodiments of the invention involve providing an expanded data set by adding shadow data to a historical bid data set that allows a logistic regression approach to mathematically calculate the coefficient for price sensitivity with greater accuracy.

11 Claims, 11 Drawing Sheets

U.S. PATENT DOCUMENTS

| | | | |
|---|---|---|---|
| 5,974,399 | A | 10/1999 | Giuliani et al. |
| 5,974,403 | A | 10/1999 | Takriti et al. |
| 5,987,425 | A | 11/1999 | Hartman et al. |
| 6,021,402 | A | 2/2000 | Takriti |
| 6,023,686 | A | 2/2000 | Brown |
| 6,047,274 | A | 4/2000 | Johnson et al. |
| 6,076,071 | A | 6/2000 | Freeny, Jr. |
| 6,078,893 | A | 6/2000 | Ouimet et al. |
| 6,078,906 | A | 6/2000 | Huberman |
| 6,085,164 | A | 7/2000 | Smith et al. |
| 6,094,641 | A | 7/2000 | Ouimet et al. |
| 6,101,484 | A | 8/2000 | Halbert et al. |
| 6,260,024 | B1 | 7/2001 | Shkedy |
| 6,408,283 | B1 | 6/2002 | Alaia et al. |
| 6,415,270 | B1 | 7/2002 | Rackson et al. |
| 6,446,053 | B1 | 9/2002 | Elliot |
| 6,456,982 | B1 | 9/2002 | Pilipovic |
| 6,553,352 | B2 | 4/2003 | Delurgio et al. |
| 6,963,854 | B1 | 11/2005 | Boyd et al. |
| 7,120,599 | B2 | 10/2006 | Keyes |
| 2001/0037278 | A1 | 11/2001 | Messmer et al. |
| 2002/0123930 | A1 | 9/2002 | Boyd et al. |
| 2003/0061119 | A1 | 3/2003 | Kocher |
| 2003/0093357 | A1 | 5/2003 | Guler et al. |
| 2003/0110066 | A1 | 6/2003 | Walser et al. |
| 2003/0220773 | A1* | 11/2003 | Haas et al. .................. 703/2 |

OTHER PUBLICATIONS

Belobaba, "Application of a Probabilistic Decision Model to Airline Seat Inventory Control", Operations Research vol. 37, No. 2, Mar.-Apr. 1989.

Bitran, et al., "An Application of Yield Management to the Hotel Industry Considering Multiple Day Stays", Operations Research, vol. 43, No. 33, May-Jun. 1995.

Bruno, "Net Risks Pay Off for Hyatt Hotels, State of Iowa", Network World, vol. 11:47, Nov. 21, 1994.

Burnett, et al., "Effective Bid Pricing for Unit Price Contracts", Engineering Economist, Summer 1994, vol. 39, No. 4, pp. 293-331.

Carroll, et al. "Evolutionary Change in Product Management Experiences in the Car Rental Industry", Interfaces 25:5 Sep.-Oct. 1995, pp. 84-104.

Curry, "Optimal Airline Seat Allocation with Fare Classes Nested by Origins and Destinations", Transportation Science, vol. 24, No. 3, Aug. 1990.

Fu et al., "Promotion or Demotion? An Empirical Investigation of the Determinants of Top Mutual Fund Manager Change", Fuqua School of Business, Duke University, Durham, NC, Sep. 1, 2000.

Charles R. Plott & Jared Smith, "Instability of Equlibria in Experimental Markets: Upward-Sloping Demands, Extemalties, and Fad-Like Incentives", Southern Economic Journal, Jan. 1999, vol. 65, iss. 3.

Handbook of Mathematical Functions with Formulas, Graphs, and Mathematical Tables Edited by: Abramowitz, M.; Stegun, I.A. 1972 U.S. Department of Commerce pp. 925-964.

Cagno et al. "Multi-criteria assessment of the probability of winning in the competitive bidding process", International Journal of Project Managers. 19 (2001), 313-324.

Drew, et al., The Effect of Contract Type and Size or Competiveness in Bidding, Construction Management and Economics, Abstract, Sep. 1997.

Phillips, "A Marginal-Value Approach to Airline Origin and Destination Revenue Management" proceedings of the 16$^{th}$ IFIP Conference on System Modeling and Optimization, 1994.

Luk, et al., "Interaction Between Land-Use/Distribution and Assignment", Institute of Engineers, Australia, 11 nation Circuit, Bartonm A.C.T. 2600, Australia; Apr. 1980 (Abstract Only).

Swan, "Revenue Management-Myths and Methods", United Airlines, Jul. 1988.

Gupta, et al., "A Practical Approach to Network-Based Seat Inventory Management", Integrated Decisions and systems, Inc. 1993.

Phillips, "A Note on Leg Marginal Values and Bid Prices", Decision focus Incorporated, Apr. 1994.

Gallego, et al., "A Multi-Product Dynamic Pricing Problem and its Applications to Network Yield Management", National Science Foundation, Jan. 1994.

Boyd, et al. U.S. Appl. No. 09/517,977, filed Mar. 3, 2000.

\* cited by examiner

Target Price Calculator

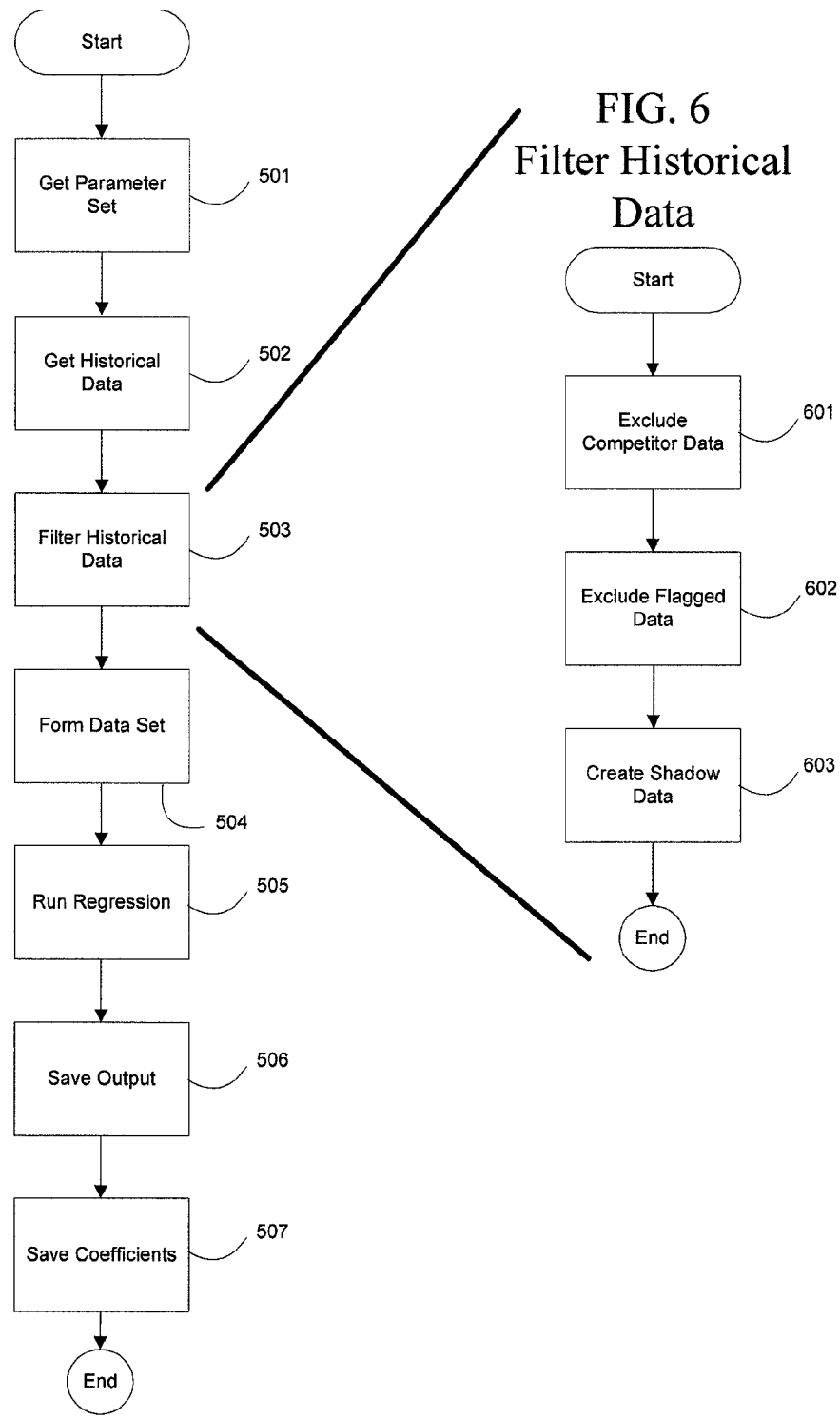

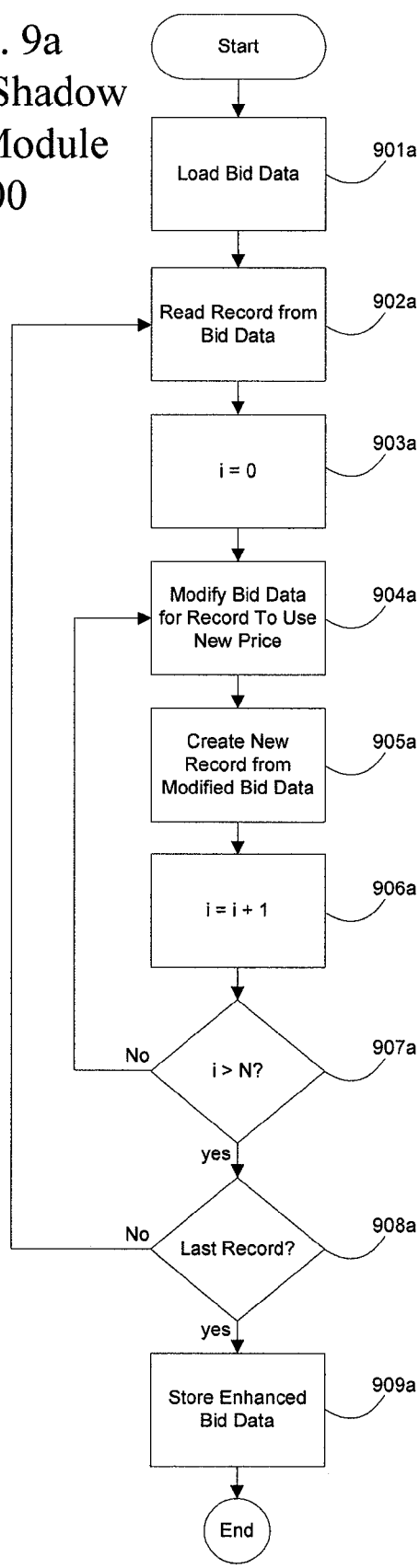
FIG. 9a Create Shadow Data Module 900

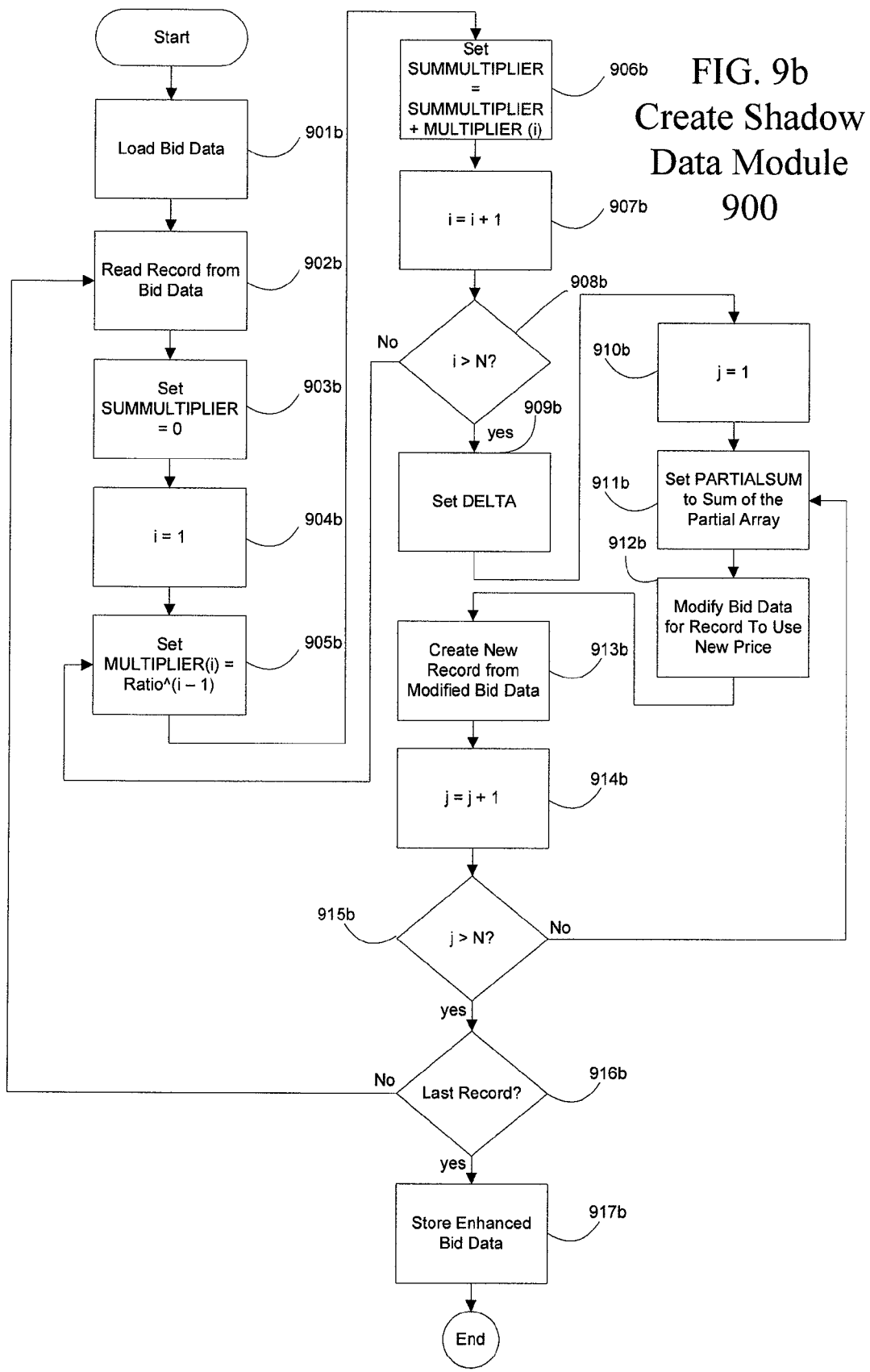
FIG. 9b Create Shadow Data Module 900

SYSTEMS AND METHODS FOR IMPROVED CALCULATION OF COEFFICIENT FOR PRICE SENSITIVITY

BACKGROUND

Parcel shipping is a highly competitive industry, particularly for large commercial customers of parcel shipping companies. These shipping clients typically purchase shipping services through a competitive bidding process. For instance, a shipping client takes bids on an annual basis to select a parcel shipping company to handle substantially all of the client's shipping needs for an annual period. Although air and ground shipping services are sometimes bid separately, within these categories each contract is typically bid as an "all requirements" shipping contract covering a portfolio of shipping services for an extended period of time, such as, for example, a year.

A major parcel shipping company may have thousands of commercial contracts of this nature that are competitively re-bid on an annual basis. In addition, each shipping client may have aspects to their shipping needs that, if properly reflected in the bid price, can improve the parcel shipping company's likelihood of winning the bid. For example, some customers may be more expensive to provide service to than others, due to factors such as average size of the parcels, the typical number of parcels in each pickup, the distance and particular locations shipped to, the proximity of pickup sites to transportation routes, and many other factors. In practice, knowledge of these special factors allows the parcel shipping company to profitably offer many potential clients a discount or incentive to win their business.

Traditionally, bid pricing in the parcel shipping industry has been assisted by computer systems that estimate the cost of serving individual customers, taking into account the special factors listed above. However, many traditional cost-of-service based bidding systems have a number of drawbacks as pricing tools for competitively bid goods and services. Specifically, these systems lack the ability to factor the market response of customers and competitors into the pricing decisions. This is because, in large-part, these systems are cost-focused, even though customers may demand products and services that are tailored to their specific needs. Thus, target pricing systems have been developed to reflect market and competitor response characteristics into bid pricing to attempt to address the drawbacks of traditional cost-of-service based bidding systems.

In many instances, these systems include market response models that take market and competitor response characteristics into account. In addition, these models may be configured to utilize logistic regression to calculate coefficients for both "brand preference" and "price sensitivity" input variables in order to determine the best estimate for the probability of winning the bid. However, many times, the models used in legacy systems are not able to calculate a sufficiently accurate coefficient for price sensitivity, and as a result, this parameter is fixed at a constant value. Therefore, a need exists for providing an expanded data set that allows the logistic regression approach to mathematically calculate the coefficient for price sensitivity with greater accuracy.

BRIEF SUMMARY OF VARIOUS EMBODIMENTS OF THE INVENTION

Various embodiments of the invention provide systems and methods for creating shadow data to enhance a historical bid data set. In particular embodiments, the historical bid data set includes a plurality of records in which each record of the plurality of records representing a bid for business.

In various embodiments, the systems and methods are configured for setting a variable N to a positive integer corresponding to a number of additional data records to be added for each record in the historical bid data set. In addition, the systems and methods are configured for setting a variable Delta to a positive number corresponding to a percentage change in a price where each new data record is created. In particular embodiments, the systems and methods are configured for setting a variable i equal to 0, setting a variable P as an original price for a bid represented by the record, and looping N number of times for each record in the historical bid data set.

For each loop, the systems and methods are configured for modifying the record to use a new price P' that corresponds to a new price ratio of PR−i*Delta, in response to the bid being an accepted bid, or modifying the record to use a new price P' that corresponds to a new price ratio of PR+i*Delta, in response to the bid being a rejected bid. Further, for each loop, the systems and methods are configured for saving the modified record as a new record in the historical bid data set to form an enhanced historical bid data set and adding one to the variable i.

In various embodiments, the systems and methods are further configured for determining a coefficient of price sensitivity by performing a regression analysis on the enhanced historical bid data set. In particular embodiments, the regression analysis is performed as a logistic regression. Further, in various embodiments, the systems and methods are configured for defining a market response model using the enhanced historical bid data set, wherein the market response model provides a probability of winning a bid at a particular price. In particular embodiments, the systems and methods are further configured for using the market response model to determine an optimal price for the bid.

In addition, various embodiments of the invention provide systems and methods for creating shadow data to enhance a historical bid data set that are configured for setting a variable N to a positive integer corresponding to a number of additional data records to be added for each record in the historical bid data set, setting a variable MaxPR to a maximum price ratio allowed, setting a variable MinPR to a minimum price ratio allowed, and setting a variable Ratio to a real number greater than or equal to one and defining a distance between successive data records that are added. In these particular embodiments, the systems and methods are configured for setting a variable SUMMULTIPLIER equal to zero, setting a variable PR as an original price for a bid represented by the record, setting a variable i equal to one, and looping N number of times for each record in the historical bid data set.

For each loop, the systems and methods are configured for setting a variable MULTIPLIER(i)=Ratio^(i−1), setting a variable SUMMULTIPLIER=SUMMULTIPLIER+MULTIPLIER(i), and adding one to the variable i. Further, for each loop, the systems and methods are configured for setting a variable Delta=(PR−MinPR)/SUMMULTIPLIER, in response to the bid being an accepted bid, or setting the variable Delta=(MaxPR−PR)/SUMMULTIPLIER, in response to the bid being a rejected bid. In addition, in these particular embodiments, the systems and methods are also configured for setting a variable j equal to one and looping N number of times.

For each of these loops, the systems and methods are configured for setting a variable PARTIALSUMMULTIPLIER to a sum of a partial array comprising MULTIPLIER(1) to MULTIPLIER(j) and modifying the record to use a new price P' that corresponds to a new price ratio of PR−Delta*PARTIALSUMMLITPLIER, in response the bid being an accepted bid, or modifying the record to use a new price P' that corresponds to a new price ratio of PR+Delta*PURTIALSUMMULTIPLIER, in response to the bid being a rejected bid. Further, in these particular embodiments, the systems and methods are configured for saving the modified record as a new record in the historical bid data set to form an enhanced historical bid data set and adding one to the variable j.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 shows a flow diagram of a GenerateMRMCoefficients module according to one embodiment of the invention.

FIG. 6 shows a flow diagram of filtering historical data according to one embodiment of the present invention.

FIG. 9a shows a flow diagram of a create shadow data module according to one embodiment of the present invention.

FIG. 9b shows a flow diagram of a create shadow data module according to another embodiment of the present invention.

DETAILED DESCRIPTION OF VARIOUS EMBODIMENTS OF THE INVENTION

Figure 1:
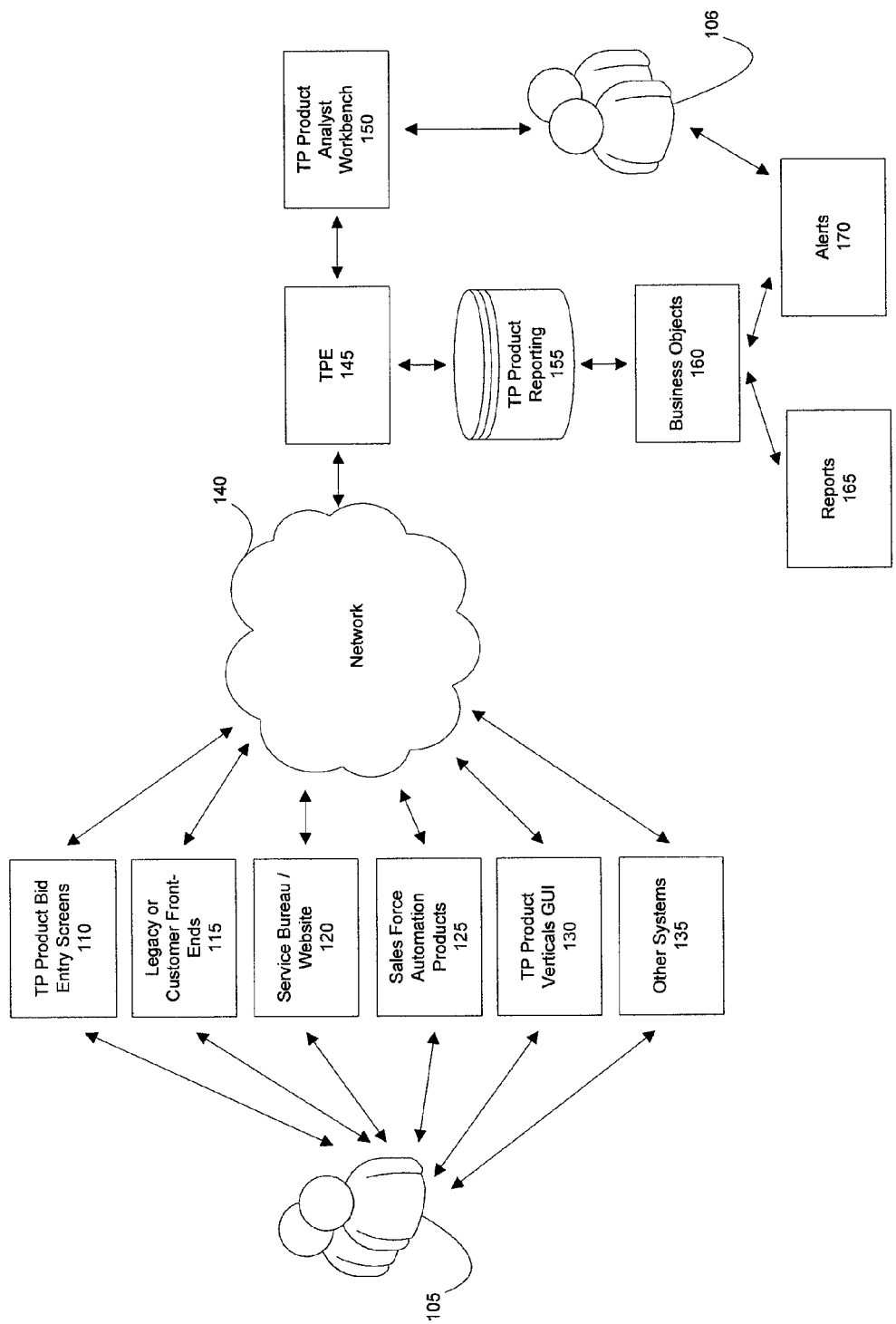
FIG. 1 shows components of a target pricing system.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. Methods, Apparatus, Systems, and Computer Program Products

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Target Pricing System

Target Pricing (TP) is generally a methodology that enables a company to optimize its pricing and associated business processes to increase profit. In many instances, TP leverages information about competitors, costs, and market response behavior to set customer-specific prices that maximize expected financial contribution. In various embodiments, a TP system may involve using different types of Graphical User Interfaces (GUIs) to collect account and bid information and to submit the information to a Target Pricing Engine (TPE) that performs an optimization and returns the optimal price range at which to offer a bid on a particular piece of business. Thus, a company may then use the optimal price range to draft and submit a proposal to a potential customer for the business associated with the bid. Such a system is described in greater detail in U.S. Pat. No. 6,963,854 issued Nov. 8, 2005 and incorporated by reference in its entirety.

For instance, FIG. 1 provides a diagram of a typical TP system. Individuals 105, such as account executives working for a company, enter the bids into the system through one or more types of computer interfaces such as TP bid entry screens 110, a legacy account management system 115, a service bureau 120, a sales force automation system 125, a product vertical interface 130, and/or other systems 135.

The TP bid entry screens 110 may be provided with the TP system for customers who do not want or need one of the other alternatives. The legacy account management system 115 is typically a proprietary solution developed by the user (e.g., company). The sales force automation system 125 is typically purchased from a third party software provider, such as, for example, Siebel®, Baan®, Vantive or Oracle®. In various embodiments, the service bureau 120 may use standard TP bid entry screens. Other systems 135 may include such components as interface screens developed specifically for alternative hardware/software tools used by individuals in the company, such as, for example, smart phones. The products vertical interface 130 may be provided as part of the TP system, but may be customized for a particular industry, e.g., freight transportation.

Each of these different types of GUI's may be used to collect account and bid information. In various embodiments, the GUI then submits a completed bid via a communications link 140, which in various embodiments may be a communications network such as the Internet and/or an intranet, to the TPE 145. The TPE 145 then performs the optimization and returns the optimal price range at which to offer the bid. In response to receiving the price range, an individual 105 in various embodiments presents the proposal to the customer and then negotiates with them. Once the final status of the bid has been determined (won or lost), the bid is updated in the system.

In various embodiments, the TPE 145 may also support analysis via an analysis interface 150. Further, in particular embodiments, the TPE 145 may also generate product report data, which is used to populate a reporting data store 155 (e.g., one or more types of storage media such as). This data may be extracted from the data store 155 and may be used to form the basis of business objects 160 used in reports 165 and alerts 170.

III. Target Price Calculator

In various embodiments, the TPE includes a Target Price Calculator (TPC) that is called upon after a bid has been constructed and needs to be priced. In various embodiments, the TPC uses a variety of parameters to perform its optimization in real-time. For instance, in particular embodiments, the inputs include a product model that defines business objects such as companies that include the TP user and/or its competitors, bids, products and/or services that the TP user provides in a bid and/or are provided by competitors, and options for auxiliary sub-products that can be added to a product, but that cannot typically be ordered on their own. Further, in particular embodiments, the inputs include parameters used for calculating market response, which may involve running a Market Response Model (MRM) at regular intervals to update these parameters in response to recently observed bid data.

Figure 2:
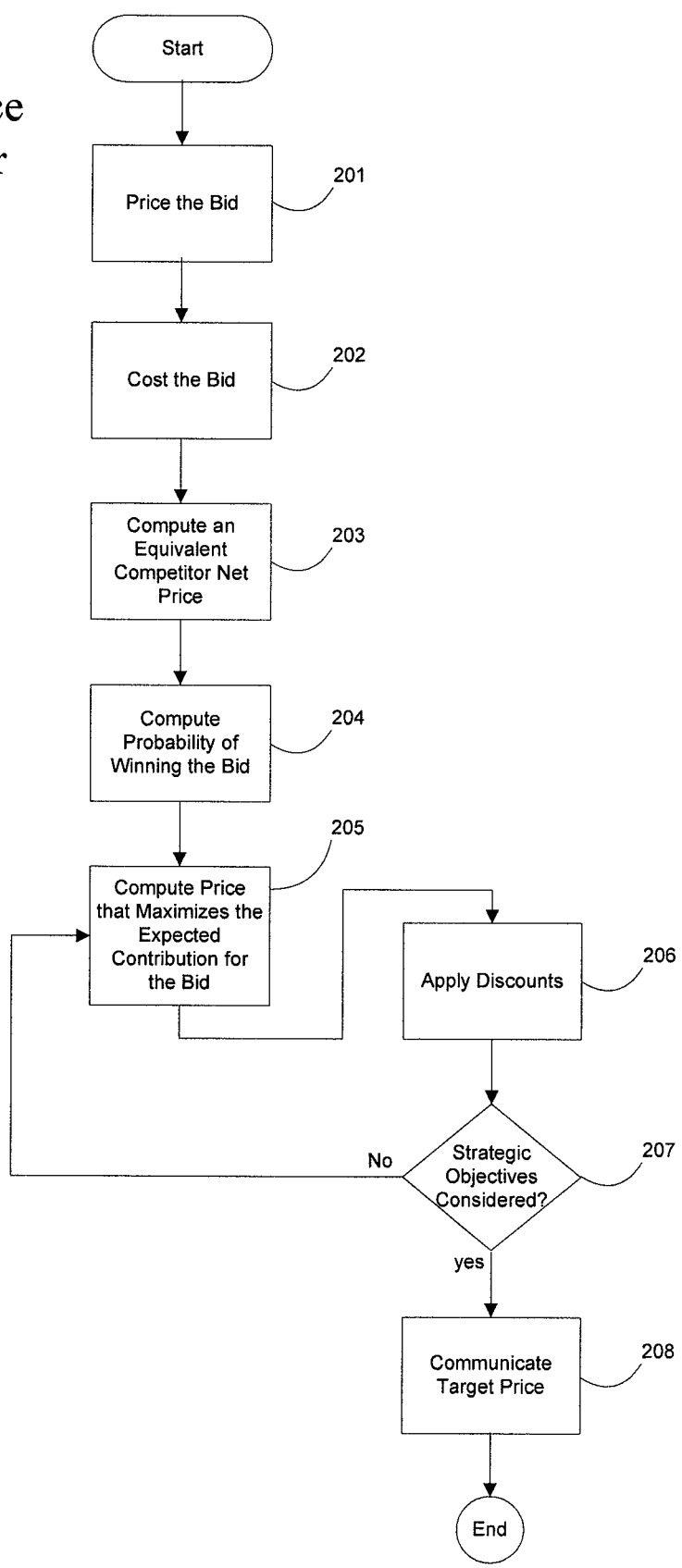
FIG. 2 shows a flow diagram of a target price calculator.

According to various embodiments, the TPC may perform several steps in order to calculate a target bid price. For instance, FIG. 2 provides a flow diagram of typical functions (e.g., steps) performed by the TPC according to one embodiment. As will be apparent from a review of the below steps, the steps carried out by the TPC in various embodiments are readily adaptable for use in an automated system, such as in software executing on a computer platform.

In Step 201, the TPC prices the bid preferably using list prices in a product model. In particular embodiments, these prices may be gathered directly from current data or obtained from a third party or proprietary pricing system. In Step 202, the TPC costs the bid using the costs in the product model. In particular embodiments, these costs may either be gathered manually, obtained from a proprietary costing system from third parties, and/or retrieved in real-time from external systems.

Once the bid is costed the TPC calculates an equivalent competitor net price for the bid, shown as Step 203. In various embodiments, the equivalent competitor net price is the price competitor(s) would charge to the particular customer after any discounting has occurred. In various embodiments, the list prices for competitor products are preferably maintained in the product model, but an appropriate discounting mechanism may be applied to the list prices to determine the net price.

Next, in Step 204, the TPC calculates the probability of winning the bid as a function of the company's price. In particular embodiments, the probability is preferably calculated using the parameters from a MRM as described is greater detail below. In addition, in particular embodiments, the benefits of target pricing over the company's existing pricing approach may be calculated.

Further, in various embodiments, the TPC is configured to perform an optimization process to generate the optimum target bid price. Thus, in Step 205, the TPC computes the price that maximizes the expected revenue contribution for the bid. In particular embodiments, this step is performed by the TPC balancing the contribution which increases as price increases, and the win probability, which decreases as price increases.

Given the target price computed above, the TPC applies any applicable discounts to each product within the bid, shown as Step 206. In addition, in particular embodiments, Steps 205 and 206 may be repeated taking into account any strategic objectives that have been specified, such as, for example, minimum success rates used to override the initial values calculated. Thus, in these particular embodiments, the TPC determines whether the strategic objectives have been considered, shown as Step 207. Finally, in Step 208, the TPC communicates a target price (e.g., a target price range). For instance, in one embodiment, the TPC relays the target price (e.g., a target price range) back to an account bid system so that the price may be used in a bid proposal to the customer.

IV. Market Response Model

As mentioned above, in various embodiments, a Market Response Model (MRM) is used in calculating the target bid price. Such a MRM is described in greater detail in U.S. Published Patent Application 2003/0220773, which is incorporated by reference in its entirety. In particular embodiments, the MRM calculates the win probability as a function of price through the examination of historical bid information at various prices. Further, in particular embodiments, the MRM requires that customers be segregated into distinct market segments. These market segments may be determined through a detailed analytical investigation.

In various embodiments, the MRM performs three key functions. First, the MRM updates the coefficients for market response predictors on the basis of historical data. These predictors are measurement or indicator variables used to estimate (or predict) the win probability for a bid. Typically, in various embodiments, these predictors are broken down into market segmentation criteria and/or bid variables. Second, the MRM evaluates the price-independent predictors for a particular bid to generate a market response curve that depends only on price. Third, the MRM calculates the estimated probability of winning (e.g., the market response) for a particular bid and offered price. Predictors may be market segmentation criteria, bid drivers, or a product of several of these. In various embodiments, the bid drivers are defined at implementation time and cannot be modified with the TP system.

Figure 3:
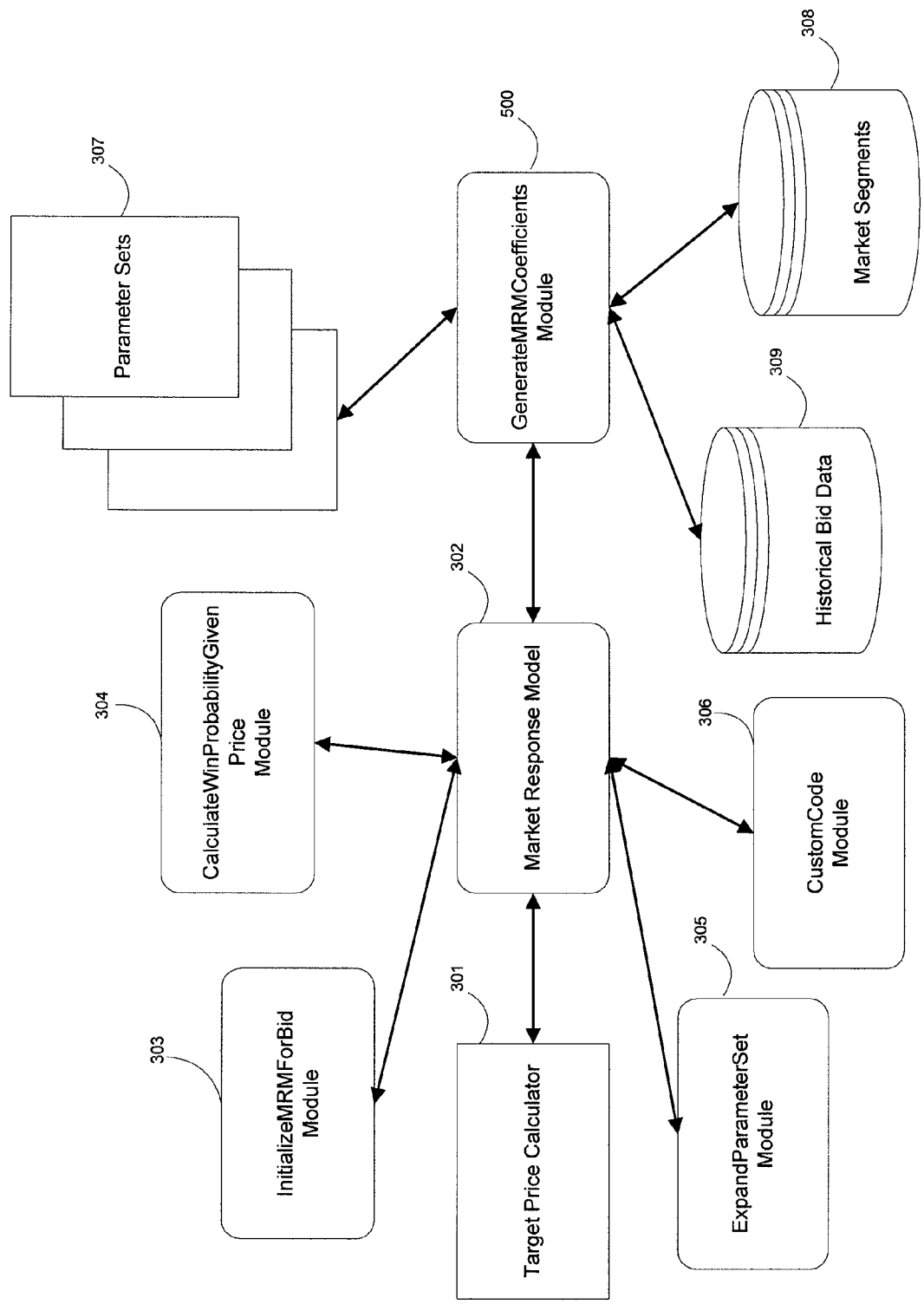
FIG. 3 shows an exemplary schematic diagram of a system that includes a market response model according to one embodiment of the present invention.

To provide these functions in various embodiments, the MRM may support one or more lower level services (e.g., modules). For example, as shown in FIG. 3, the MRM 302 may support the InitializeMRMForBid module 303. In particular embodiments, the TPC 301 invokes this module 303 once for each bid prior to starting the optimization process. Once a bid is known, the values of all variables except those based on price may be known. This module 303 evaluates each of the price-independent variables and computes their sum.

In addition, in particular embodiments, the InitializeMRMForBid module 303 and/or a GenerateMRMCoefficients module 500 may invoke the TransformPriceIndependentVariables module (not shown). In various embodiments, this module produces a set of values of market response drivers involving functional transformations of non-price bid attributes. These attributes may refer to a new bid, a currently active bid, or historical bids.

In addition, in particular embodiments, the TPC 301 invokes the CalculateWinProbabilityGivenPrice module 304 to determine the target price. The values of the price-dependent variables are computed based on the given price and are plugged into the formula along the values computed by InitializeMRMForBid module 303 to obtain the win probability. In particular embodiments, the CalculateWinProbabilityGivenPrice module 304 invokes a TransformPriceDependentVariables (not shown) to produce a set of values of market response drivers. Each driver may invoke a price variable and possibly other bid attributes that may refer to a new bid, a currently active bid, or historical bids.

In addition, in particular embodiments, the TPC 301 invokes a GenerateMRMCoefficients module 500. As described in greater detail below, part of the process for generating the coefficients is applying data filters to the historical bids (e.g., historical bid data 309) to obtain a set of bids that is be used for model fitting. In various embodiments, a regression is run to obtain the coefficients of the variables.

In addition, in particular embodiments, the TPC 301 invokes an ExpandParameterSet Module 305 prior to running the regression or displaying the model coefficients if the parameter set does not contain the expanded model representation. Finally, the TPC 301 invokes a CustomCode module 306 that may provide customized functionality based on the particular customer's system. For instance, in particular embodiments, the CustonCode module 306 may include such functionality as retrieving price dependent, price independent, discrete variable names and discrete variable levels and transforming the price dependent, price independent, and discrete variables.

For every predictor, the MRM 302 estimates and stores the coefficient values which define a market response curve. At run time, these coefficients are used in combination with bid characteristics to calculate win probabilities. That is, a model is build by fitting associated coefficients with identified predictors so as to define one or more win probability curves. Typically, coefficients fall into two categories: price-dependent and price independent. In particular embodiments, the price-independent coefficients may be viewed as constants and computed in advance when computing the optimal target price.

In various embodiments, the inputs to the MRM 302 may include the market segments 308 and the price-dependent and price-independent predictors for each market segment. The outputs from the MRM 302 may include price-independent and price-dependent coefficients, bid-specific market response curves, and bid-and-price-specific win probability estimates.

V. Market Response Server

Figure 4:
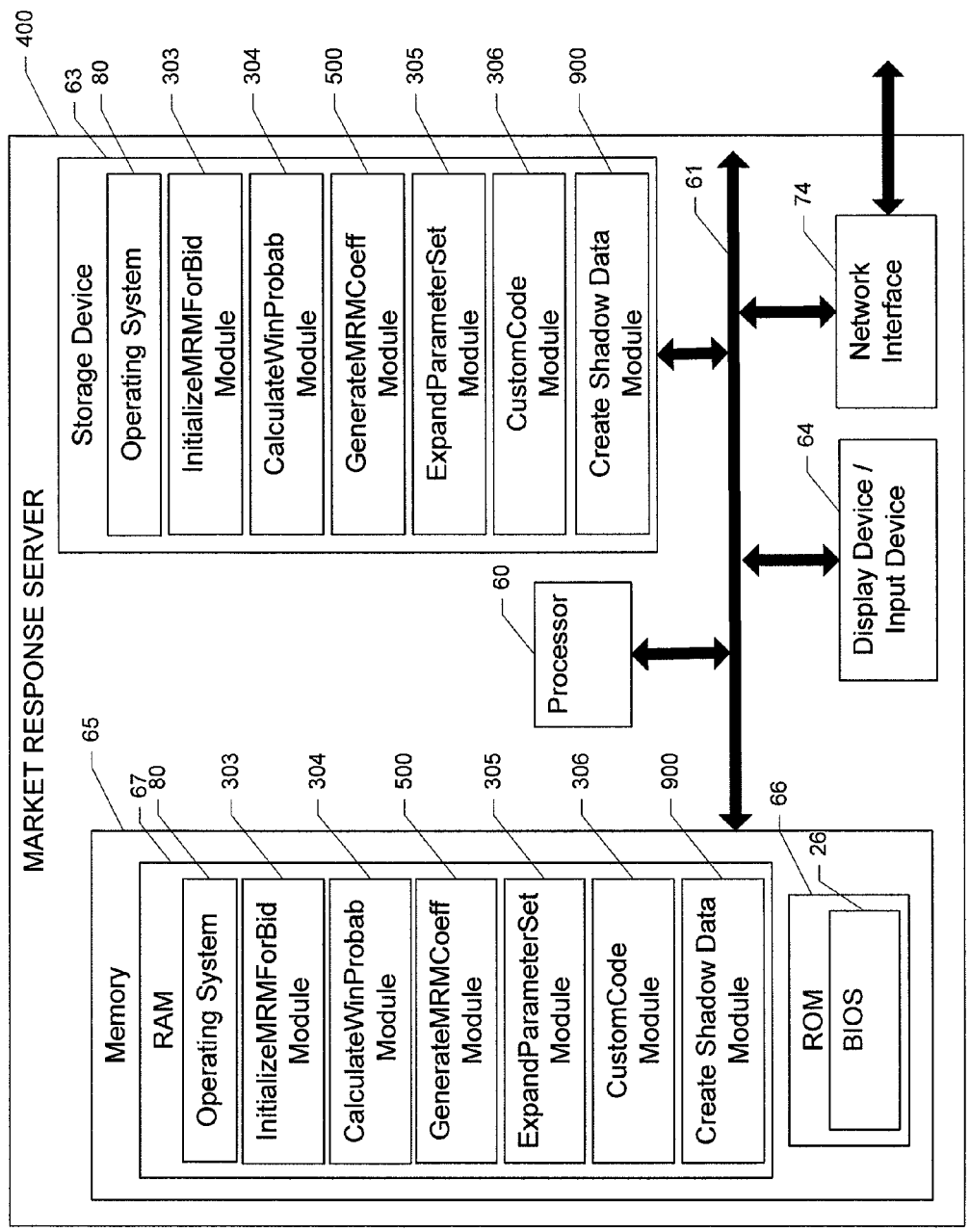
FIG. 4 shows an exemplary schematic diagram of a market response server according to one embodiment of the present invention.
Figure 7:
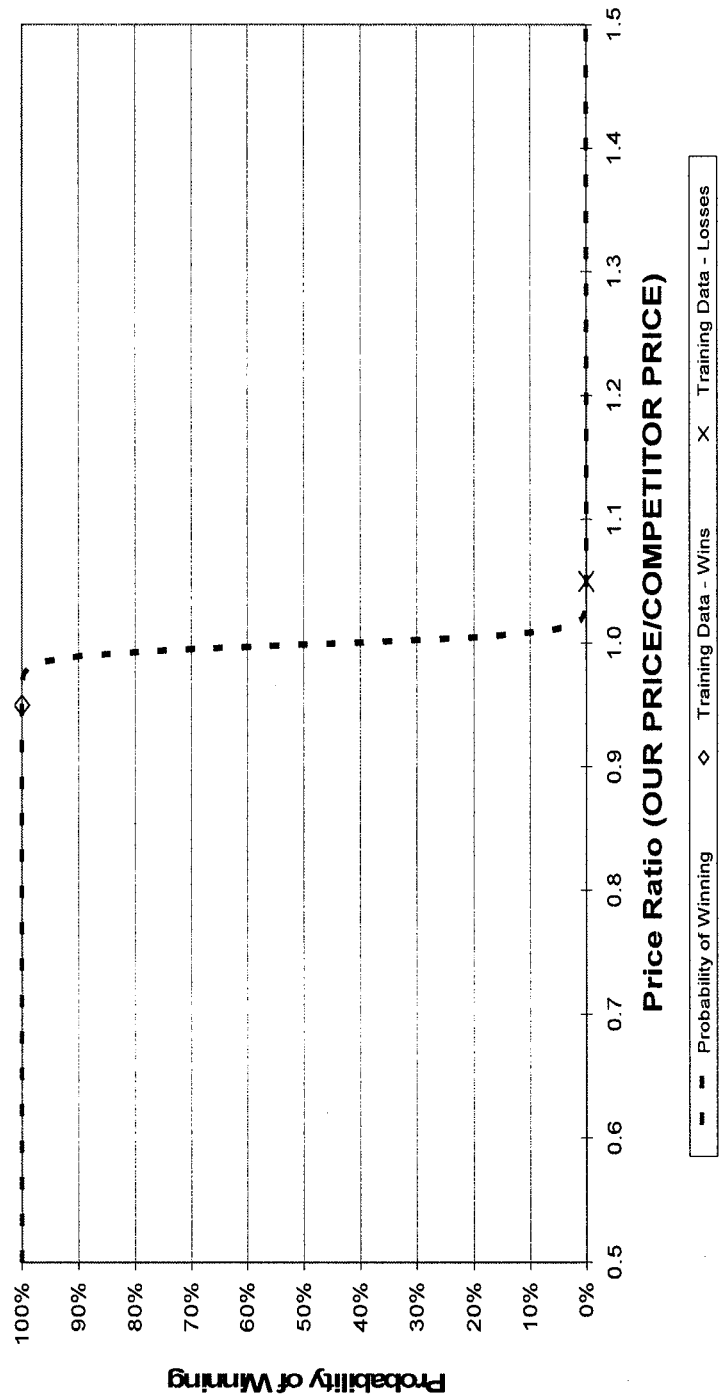
FIG. 7 shows a probability of winning chart.
Figure 8:
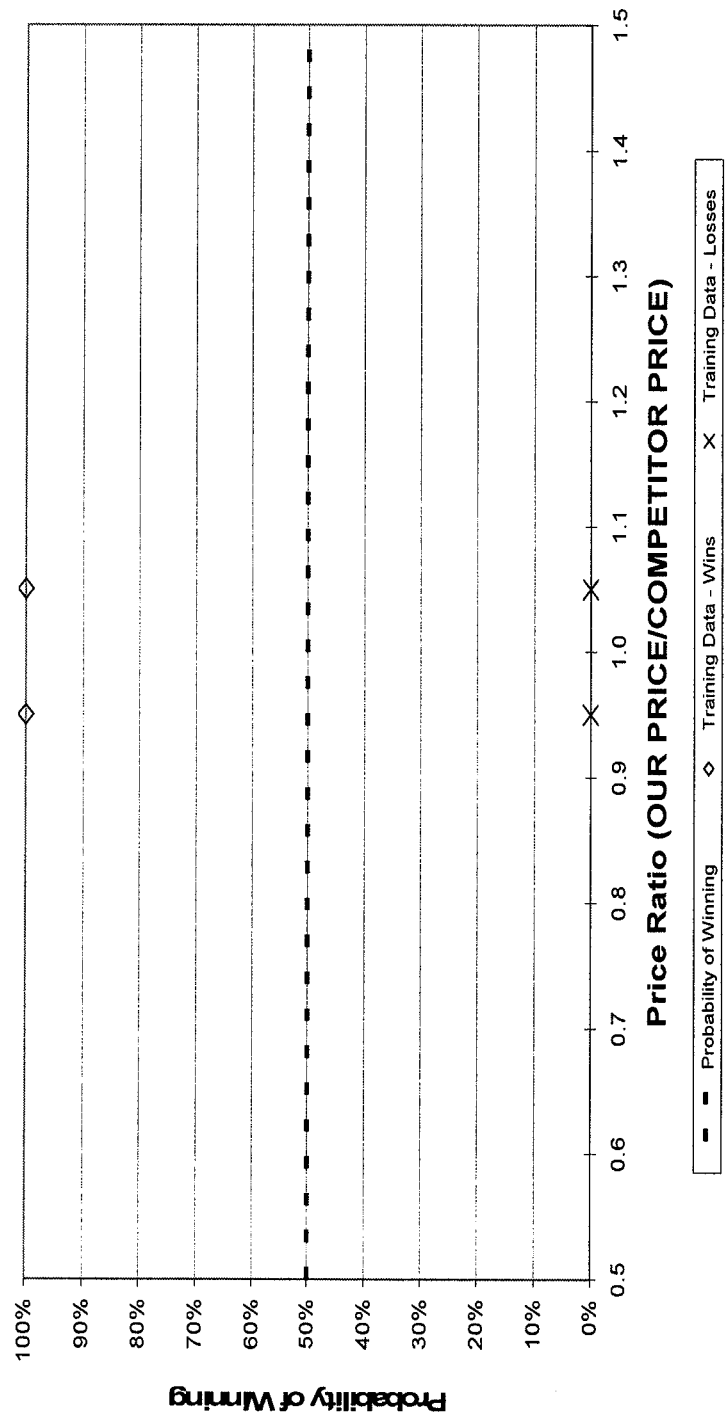
FIG. 8 shows a probability of winning chart.
Figure 10A:
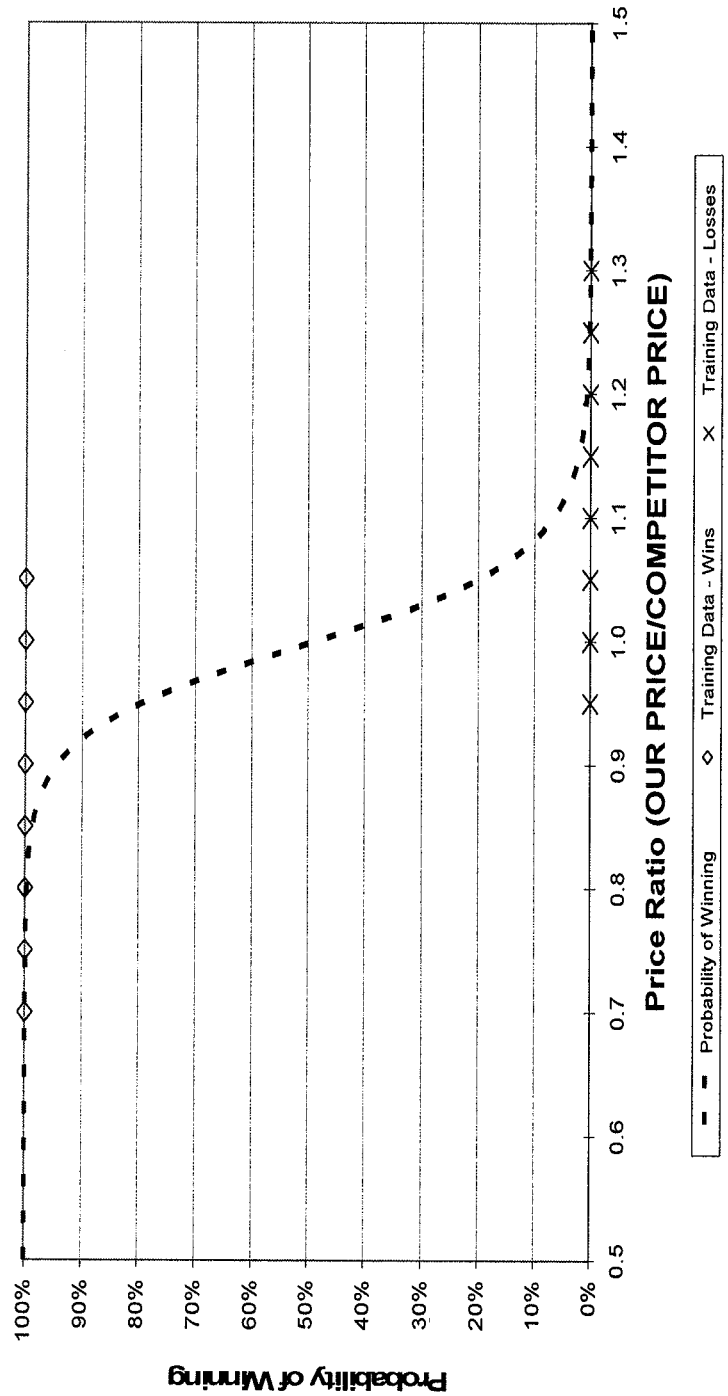
FIG. 10a shows a probability of winning chart.
Figure 10B:
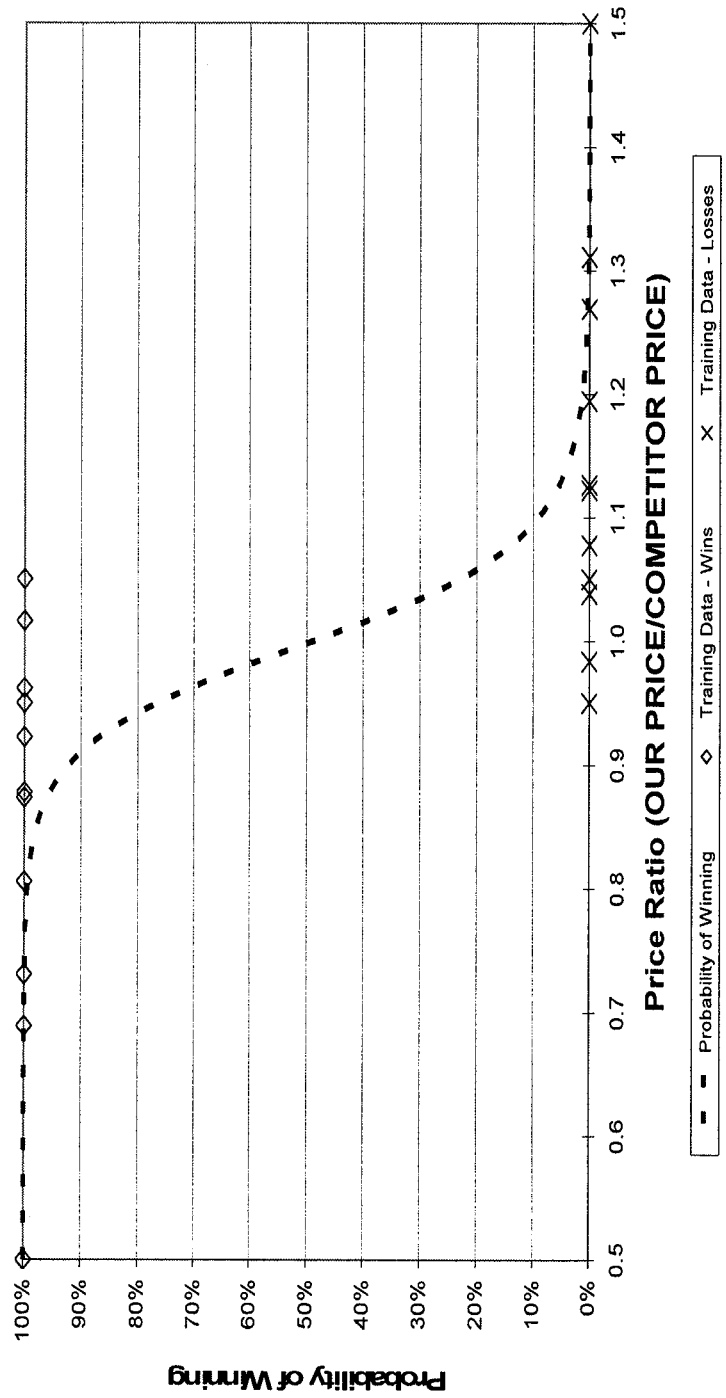
FIG. 10b shows a probability of winning chart.

In various embodiments, the MPM 302 may reside on one or more computing devices (such as one or more servers). FIG. 4 provides a schematic of a market response server 400 according to one embodiment of the present invention. The term "server" is used generically to refer to any computer, computing device, desktop, notebook or laptop, distributed system, server, gateway, switch, or other processing device adapted to perform the functions described herein. As will be understood from this figure, in this embodiment, the market response server 400 includes a processor 60 that communicates with other elements within the market response server 400 via a system interface or bus 61. The processor 60 may be embodied in a number of different ways. For example, the processor 60 may be embodied as various processing means such as a processing element, a microprocessor, a coprocessor, a controller or various other processing devices including integrated circuits such as, for example, an application specific integrated circuit ("ASIC"), a field programmable gate array ("FPGA"), a hardware accelerator, or the like. In an exemplary embodiment, the processor 60 may be configured to execute instructions stored in the device memory or otherwise accessible to the processor 60. As such, whether configured by hardware or software methods, or by a combination thereof, the processor 60 may represent an entity capable of performing operations according to embodiments of the present invention while configured accordingly. A display device/input device 64 for receiving and displaying data is also included in the market response server 400. This display device/input device 64 may be, for example, a keyboard or pointing device that is used in combination with a monitor. The market response server 400 further includes memory 65, which may include both read only memory ("ROM") 66 and random access memory ("RAM") 67. The application server's ROM 66 may be used to store a basic input/output system ("BIOS") 26 containing the basic routines that help to transfer information to the different elements within the market response server 400.

In addition, in one embodiment, the market response server 400 includes at least one storage device 63, such as a hard disk drive, a CD drive, and/or an optical disk drive for storing information on various computer-readable media. The storage device(s) 63 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 63 may be connected to the system bus 61 by an appropriate interface.

Furthermore, a number of program modules (e.g., set of computer program instructions) may be stored by the various storage devices 63 and/or within RAM 67. Such program modules may include an operating system 80, the InitializeMRMForBid module 303, the CalculateWinProbabilityGivenPrice module 304, the ExpandParameterSet module 305, the CustomCode module 306, and the GenerateMRMCoefficients module 500, as previously described, and a create shadow data module 900. As previously explained, these modules 303, 304, 305, 306, 500, 900 may control certain aspects of the operation of the market response server 400 with the assistance of the processor 60 and operating system 80, although their functionality need not be modularized.

Also located within the market response server 400, in one embodiment, is a network interface 74 for interfacing with various computing entities. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the market response server 400 may be configured to communicate via wireless external communication networks using any of a variety of protocols, such as 802.11, general packet radio service ("GPRS"), wideband code division multiple access ("W-CDMA"), or any other wireless protocol.

It will be appreciated that one or more of the market response server's 400 components may be located remotely from other market response server 400 components, such as multiple market response servers 400. Furthermore, one or more of the components may be combined and additional components performing functions described herein may be included in the market response server 400.

VI. Exemplary System Operation

Reference will now be made to FIGS. 5-10b which illustrate operations and processes as produced by various embodiments of the invention. For instance, FIG. 5 provides a flow diagram of the GenerateMRMCoefficients module 500 as previously described above. FIG. 6 provides a flow diagram for filtering historical data that is used to form the data set used by the GenerateMRMCoefficients module 500 according to various embodiments. Further, FIGS. 9a and 9b provide flow diagrams of a create shadow data module 900 invoked by the GenerateMRMCoefficients module 500 according to various embodiments. These modules 500, 900 are described in greater detail below.

a. GenerateMRMCoefficients Module

As previously described, in various embodiments, the TPC 301 invokes a GenerateMRMCoefficients module 500 to generate the coefficients used in combination with account and bid characteristics to calculate win probabilities. FIG. 5 illustrates a flow diagram of the GenerateMRMCoefficients module 500 according to various embodiments. This flow diagram may correspond to the steps carried out by the processor 60 in the market response server 400 shown in FIG. 4 as it executes the module 500 in the server's RAM memory 67 according to various embodiments.

Thus, starting with Step 501, the GenerateMRMCoefficients module 500 retrieves a current parameter set. In various embodiments, the parameter set may include market segmentation and bid characteristics. As previously described, market segments may be defined so that information on groups with similar attributes are used for various functionality in the TP system. For instance, segments may be defined under discrete segmentation such as grouping customers by regions of the country. Continuous segmentation may also be used to group customers into specific buckets using a continuous indicator variable such as annual revenues. Hierarchical market segmentation may also be used to group customers into more than one layer of segmentation such as geographic region (e.g., North, South, East, and West) and state (e.g., Florida, Georgia, Maine, New York). Any combination of these or other segmentation techniques may be sued to group data. In various embodiments, these market segments may be used in market response modeling for estimating how different types of customers react to different prices, for price and cost modeling, to model competitor discounting behavior, and to model pre-existing pricing methods.

In many instances, bid characteristics are set up by the system owner during installation and the values for the characteristics are specific to the particular bid being evaluated. For example, the bid characteristics may be defined as bid volume (e.g., the quantity ordered for a given portfolio), bid gross revenue (e.g., list price×quantity for all products in the portfolio), bid contribution (e.g., contribution=(revenue−cost)×quantity for all the products in a given bid), and key competitors (e.g., define competitors that exist for a given bid).

The GenerateMRMCoefficients module 500 next retrieves historical data on one or more bids, shown as Step 502. In various embodiments, the historical data includes variables reflecting customer characteristics, product characteristics, and market characteristics. This data may be stored either internally within the TP system or may retrieved from an external source. For instance, the historical data may come from multiple sources such as sources that represent current marketplace conditions, sources that include data from a mix of products and competitors, and/or sources that include a complete set of quote records (e.g., account characteristics, quote characteristics, prior price offered, competitors, competitors' offered prices, and prior quote winners). Next, in Step 503, the GenerateMRMCoefficients module 500 applies one or more data filters to the historical data. As is described in greater detail below, this step is performed to exclude data for undesired bids from the data set used to determine the coefficients.

In Step 504, the GenerateMRMCoefficients module 500 forms the data set used to run the regression. That is, in various embodiments, the GenerateMRMCoefficients module 500 transforms the bid attributes into forms that can be used in the MRM 302. For instance, in particular embodiments, the GenerateMRMCoefficients invokes one or more modules to transform the price independent variables, the price dependent variables, and the discrete variables for each bid in the filtered historical data into a form that can be used in the MRM 302. In many instances, the modules invoked to perform the transformation may include custom code because of variations in the historical bid data that may have from user to user.

Once the data set is in the proper form, the GenerateMRMCoefficients module 500 runs a regression analysis on the data set, shown as Step 505. Dependent on the embodiment, the module 500 may use different forms of regression on the data set. For instance, in various embodiments, the module 500 performs binomial logistic regression on the data set. While in other embodiments, the module 500 performs multinomial logistic regression. Thus, in these particular embodiments, the GenerateMRMCoefficients module 500 uses the logit function to determine the best fitting market response curve. This form of regression may be used in order to ensure the output is between zero and one for any set of characteristics. In addition, this form of regression provides a smooth negative slope that makes it easy to get price sensitivity from the first derivative, and mathematical properties of the logit function offer efficient numerical computation and an intuitive interpretation of the fitted coefficients. As a result of the regression analysis, the coefficients for the market response variables are calculated. Given these coefficients, the win probability of any bid can easily be calculated for a specific price.

In Step 506, the GenerateMRMCoefficients module 500 saves the output of the regression. For instance, in one embodiment, the GenerateMRMCoefficients module 500 saves the output to one or more files that are stored within the TP system. While in another embodiment, the module 500 saves the output to one or more databases within the TP system. It should be apparent to those of ordinary skill in the art in light of this disclosure that the output may be saved in a variety ways using a variety of storage media. Finally, in Step 507, the GenerateMRMCoefficients module 500 saves the determined coefficients in the active parameter set. As a result, the coefficients may then be used for future target pricing inquiries to calculate win probabilities.

Returning to Step 503 for filtering the historical data, FIG. 6 provides a flow diagram of the steps carried out by the GenerateMRMCoefficients module 500 according to one embodiment. In Step 601, the GenerateMRMCoefficients module 500 excludes bids won by competitors not named in the list of competitors in the active parameter set. Further, in Step 602, the GenerateMRMCoefficients module 500 excludes flagged data. In particular embodiments, various bids in the historical data set may be marked with an "exclude bid" flag for various reasons. For instance, a particular bid may be identified as an outliner because the bid represents a winning bid however the bid may have been won because of circumstances outside of the bid characteristics. For example, a bid may have been won because the bid was enter by a company owned by a relative of an officer of the company accepting the bid. Therefore, the bid may have been won because of nepotism as opposed to the competitive nature of the bid. Therefore, in this instance, the bid may be marked with an exclusion flag.

In Step 603, the GenerateMRMCoefficients module 500 creates shadow data to add to the historical bid data. In various embodiments, one of the coefficients calculated by the GenerateMRMCoefficients module 500 is a coefficient for price sensitivity. Typically, the probability of winning a bid decreases as the bid price increases. That is, typically, customers are less willing to purchase a product as the price of the product increases. However, under certain circumstances, the probability of winning a bid may have a direct relationship with bid price as opposed to an inverse relationship. There are a number of reasons this may occur. For instance, in certain circumstances, one or more competitors may employ implicit strategies. For example, in certain circumstances, there may be situations in which a buyer may be willing to pay a higher price to a particular seller because of certain intangibles such as long-term loyalty and/or superior service. Under these circumstances, the seller may recognize this and may deliberately set the price higher to maximize profit. In the converse situation, a seller may realistically have little chance of winning a bid and may be willing to gamble with a very low price offer. If these two scenarios occur with some frequency, the historical data may produce results that are not reasonably sound. To counter this effect, in many instances, the coefficient for price sensitivity is arbitrarily fixed as a constant (e.g., -12) for all customers and products.

To further illustrate this problem, consider a historical data set consisting of two bids: (1) Customer A accepts a bid at a price ratio (calculated as the company's price divided by the competitor's price) of 0.95 and (2) Customer B rejects a bid at a price ratio of 1.05. Solving this example with logistic regression gives the probability curve shown in FIG. 7. This curve is consistent with a rational decision-maker in that as the company's price (and the price ratio) is reduced, the customer is more likely to accept the bid. However, if two more data points are added that include (3) Customer C rejects a bid at a price ratio of 0.95 and (4) Customer D accepts a bid at a price ratio of 1.05, the probability curve becomes the curve shown in FIG. 8. This curve is inconsistent with a rational decision-maker in that the company's price has zero impact on the probability of winning the bid. However, historical data sets of bid information are typically centered on a price ratio of 1.0 because many bids offered to customers are at or near the competitor's price, with other "brand preference" attributes becoming the deciding factor in bid acceptance (as explained above). Furthermore, any uncertainty in the competitor's price as used in the calculation of the price ratio can exacerbate the problem by perturbing the price ratio by small amounts in either direction. As a result, using logistic regression to calculate the price sensitivity can lead to irrational results that indicate that customers do not consider price or, in some cases, are more likely to accept a bid at higher prices than at lower prices.

Thus, to offset these particular situations, the GenerateMRMCoefficients module 500 in various embodiments of the invention is configured to create shadow data. As is explained in greater detail below, shadow data is used to counter the data representing the surprising bid outcomes as described above and is based on assumptions about a rational decision-maker. Therefore, in various embodiments, shadow data is used to enhance the historical bid data with corresponding "shadow data points" in order to increase the accuracy of the coefficient for price sensitivity. As is described below, in these particular embodiments, the GenerateMRMCoefficients module 500 is configured to invoke a create show data module 900 to perform this function of enhancing the historical bid data with shadow data points.

b. Create Shadow Data Module

In various embodiments, the create shadow data module 900 works under one or more assumptions about a rational customer. For instance, in particular embodiments, the create shadow data module 900 works under the assumption that if a customer accepts a bid at a price of X, then the customer would accept a similar bid at any price less than X. Further, in particular embodiments, the create shadow data module 900 works under the assumption that if the customer rejects a bid at a price of X, then the customer would reject a similar bid at any price greater than X. In addition, it should be noted that simply arbitrarily adding a large number of shadow data points increases the size of the data set significantly, which increases the time it takes for the GenerateMRMCoefficients module 500 to solve for the logistic regression coefficients. Therefore, in various embodiments, the create shadow module 900 is configured to enhance the historical bid data by adding data points in specific areas to provide greater benefit to the price sensitivity calculations.

FIG. 9a illustrates a flow diagram of the create shadow data module 900 according to one embodiment. For this particular version of the module 900, two parameters (in addition to the historical bid data) are used for input. The first parameter is Delta, which is a positive number corresponding to a percentage change in the firm's price where each new data point will be created. The second parameter is N, which is a positive integer corresponding to the number of additional data points to be added for each existing data point in the historical bid data set.

Beginning with Step 901a, the create shadow data module 900 loads the historical bid data. For instance, in one embodiment, the create shadow data module 900 loads the historical bid data in temporary storage. This storage may be located, for example, on the market response server 400, another computing device, or on some storage media. Further, in particular embodiments, the historical bid data may have already been filtered by the GenerateMRMCoefficients module 500 by excluding the competitor data and/or the data that has been flagged (as previously described).

In Step 902a, the create shadow data module 900 reads a record from the historical bid data. The term "record" is used to represent data from the historical bid data related to a single bid. In Step 903a, the create shadow data module 900 sets a counter (e.g., i) to zero (0) and modifies the bid data for the record to use a new price, shown as Step 904a. In this particular embodiment, the create shadow data module 900 first determines whether the current record is for an accepted bid or for a rejected bid. Allowing for P to be the original price for the bid, for an accepted bid, the create shadow data module 900 modifies the bid data for the current record to use a new price P' that corresponds to a new price ratio of PR−i*Delta. For a rejected bid, the create shadow data module 900 modifies the bid data for the current record to use a new price P' that corresponds to a new price ratio of PR+i*Delta. The create shadow data module 900 then creates a new record from the modified bid data record to add to the historical bid data, shown as Step 905a. Thus, as a result, the historical bid data (e.g., enhanced historical bid data) now includes the current record read by the create shadow data module 900 and a new record created from the modified data of the current record.

In Step 906a, the create shadow data module 900 increments the counter i and determines whether the counter i is greater than the parameter N, shown as Step 907a. If the create shadow data module 900 determines the counter i is not greater than the parameter N, the create shadow data module 900 repeats Steps 904a, 905a, and 906a using the incremented counter i. However, if the create shadow data module 900 determines the counter i is greater than N, the create shadow data module 900 determines whether the current record is the last record in the historical bid data set, shown as Step 908a. If the current record is not the last record in the historical bid data set, the create shadow data module 900 reads the next record from the historical bid data set, shown as Step 902a, and repeats the process (e.g., Steps 903a, 904a, 905a, 906a, 907a, and 908a) for the newly read record.

Once the create shadow data module 900 determines the last record has been read and processed, the module 900 stores the enhanced historical bid data, shown as Step 909a. Thus, in various embodiments, the create shadow data module 900 may store the enhanced historical bid data in temporary and/or permanent storage. As a result, the GenerateMRMCoefficients module 500 then uses the enhanced historical bid data to form the data set for the regression analysis.

It should be noted that the result of the procedure described above is an enhanced historical data set that has N+1 times as many records as the beginning historical bid data set. Therefore, using the four data points in the second example described above and inputs of Delta=0.05 and N=5, the price sensitivity is now calculated as show in FIG. 10a. The result is a curve that is rational with respect to changes in price.

FIG. 9b illustrates a flow diagram of the create shadow data module 900 according to a second embodiment. For this particular version of the module 900, four parameters (in addition to the historical bid data) are used for input. These four parameters include: (1) MaxPR, which is the maximum price ratio allowed; (2) MinPR, which is the minimum price ratio allowed; (3) Ratio, which is a real number greater than or equal to 1 defining the distance between successive data points that are added, a value of 1 results in equal distances between data points, a value much greater than 1 adds points closer to the original bid than the extremes; and (4) N, which is a positive integer corresponding to the number of additional data points to be added for each existing data point in the historical bid data set.

Therefore, turning to FIG. 9b, the create shadow data module 900 loads the historical bid data (Step 901b) and reads the first record of the historical bid data (Step 902b) in similar fashion as described above with respect to the version of the create shadow data module 900 described in FIG. 9a. In Step 903b, the create shadow data module 900 sets the variable SUMMULTIPLIER=zero (0) and, in Step 904b, sets the counter i=one (1). Next, the create shadow data module 900 sets the variable MULTIPLIER(i)=Ratio^(i−1), shown as Step 905b, and sets SUMMULTIPLIER= SUMMULTIPLIER+MULTIPLIER(i), shown as Step 906b. Next, the create shadow data module 900 increments the counter i by one (1), shown as Step 907b. In Step 908b, the create shadow data module 900 determines whether the counter i is greater than the variable N. If the counter i is not greater than N, the create shadow data module 900 returns to Step 905b and re-sets the variable MULTIPLER(i) and repeats Steps 906b, 907b, and 908b. Thus, the create shadow data module 900 loops through these steps N number of times.

If the counter i is greater than N, the create shadow data module 900 then sets the variable DELTA, shown as Step 909b. For this particular embodiment, allowing for PR be the original price ratio for this bid, the create shadow data module 900 sets DELTA based on whether the current record is for an accepted bid or for a rejected bid. If the current record is for an accepted bid, the create shadow data module 900 sets DELTA=(PR−MinPR)/SUMMULTIPLIER. However, if the current record is for a rejected bid, the create shadow data module 900 sets DELTA=(MaxPR−PR)/SUMMULTIPLIER.

Next, the create shadow data module 900 resets the counter j to 1, shown as Step 910b. In Step 911b, the create shadow data module 900 sets the variable PARTIALSUMMULTIPLIER to the sum of the partial array of MULTIPLIER(1) to MULTIPLIER(j). Allowing for P be the original price for this bid, the create shadow data module 900 modifies the bid data for the current record, shown as Step 912b. If the current record is for an accepted bid, the create shadow data module 900 modifies the bid data for the current record to use a new price P' that corresponds to the new price ratio of PR−DELTA*PARTIALSUMMULTIPLIER. However, if the current record is for a rejected bid, the create shadow data module 900 modifies the bid data for the current record to use a new price P' that corresponds to the new price ratio of PR+DELTA*PARTIALSUMMULTIPLIER.

Next, the create shadow data module 900 creates a new record from the modified bid data for the historical bid data set, shown as Step 913b. Thus, the historical bid data set (e.g., enhanced historical bid data set) now includes the current record read by the create shadow data module 900 and a new record created from the modified data of the current record. At this point, the create shadow bid data module 900 increments the counter j by one (1), shown as Step 914b, and determines whether the counter j is greater than the variable N, shown as Step 915b. If the counter j is not greater than N, the create shadow data module 900 returns to Step 911b and sets the variable PARTIALSUMMULTIPLIER as describe above.

The create shadow data module 900 then repeats Steps 912b, 913b, 914b, and 915b, looping through these steps N number of times.

If the counter j is greater than N, the create shadow data module 900 determines whether the current record is the last record of the historical bid data set, shown as Step 916b. If the current record is not the last record of the historical bid data set, the create shadow data module 900 returns to Step 902b, reads the next record from the historical data set, and repeats the process for the newly read record. However, if the current record is the last record of the historical data set, the create shadow data module 900 stores the enhanced historical bid data as previously described with respect to the version of the create shadow data module 900 described in FIG. 9a, shown as Step 917b.

The result of this procedure is an enhanced historical bid data set that has N+1 times as many records as the original historical bid data set. Thus, using the four data points in the second example described above and inputs of N=5, MaxPR=1.5, MinPR=0.5, and Ratio=1.61803399, the price sensitivity is now calculated as show in FIG. 10b. That is, the result is a curve that is rational with respect to changes in price.

d. Additional Comments

It should be understood that the functionality of various modules described above may be combined or separated in particular embodiments. Therefore, the descriptions of the various modules are provided above as they relate to the functionality performed by various embodiments of the invention and should not be construed to limit the scope of the claimed invention.

VII. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for creating shadow data to enhance a historical bid data set, the historical bid data set comprising a plurality of records, each record of the plurality of records representing a bid for business, the method comprising the steps of:
   setting, via one or more processors, a variable N to a positive integer corresponding to a number of additional data records to be added for each record in the historical bid data set;
   setting, via the one or more processors, a variable Delta to a positive number corresponding to a percentage change in a price where each new data record is created; and
   for each record of the plurality of records:
      setting, via the one or more processors, a variable i equal to 0;
      setting, via the one or more processors, a variable P as an original price for a bid represented by the record; and
      looping, via the one or more processors, N number of times, wherein for each loop:
         in response to the bid being an accepted bid, modifying, via the one or more processors, the record to use a new variable P' as a new price that is based upon a new price ratio of (PR−i*Delta);
         in response to the bid being a rejected bid, modifying, via the one or more processors, the record to use a new variable P' as a new price that is based upon a new price ratio of (PR+i*Delta);
         saving, via the one or more processors, the modified record as a new record in the historical bid data set to form an enhanced historical bid data set; and
         adding, via the one or more processors, one to the variable i.

2. The method of claim 1 further comprising the step of determining a coefficient of price sensitivity by performing a regression analysis on the enhanced historical bid data set.

3. The method of claim 2, wherein the regression analysis is performed as a logistic regression.

4. The method of claim 1 further comprising the step of defining a market response model using the enhanced historical bid data set, the market response model providing a probability of winning a bid at a particular price.

5. The method of claim 4 further comprising the step of using the market response model to determine an optimal price for the bid.

6. A system for creating shadow data to enhance a historical bid data set, the historical bid data set comprising a plurality of records, each record of the plurality of records representing a bid for business, the system comprising:
   memory; and
   at least one computer processor configured to:
      read a variable N from the memory, the variable N being a positive integer corresponding to a number of additional data records to be added for each record in the historical bid data set;
      read a variable Delta from the memory, the variable Delta being a positive number corresponding to a percentage change in a price where each new data record is created; and
      for each record of the plurality of records:
         set a variable i equal to 0;
         set a variable P as an original price for a bid represented by the record; and
         loop N number of times, wherein for each loop:
            in response to the bid being an accepted bid, modify the record to use a new variable P' as a new price that is based upon a new price ratio of (PR−i*Delta);
            in response to the bid being a rejected bid, modify the record to use a new variable P' as a new price that is based upon a new price ratio of (PR+i*Delta);
            store the modified record as a new record in the historical bid data set in the memory to form an enhanced historical bid data set; and
            add one to the variable i.

7. The system of claim 6, wherein the at least one computer processor is configured to determine a coefficient of price sensitivity by performing a regression analysis on the enhanced historical bid data set.

8. The system of claim 7, wherein the at least one computer processor is configured to perform the regression analysis as a logistic regression.

9. The system of claim 6, wherein the at least one computer processor is configured to define a market response model using the enhanced historical bid data set, the market response model providing a probability of winning a bid at a particular price.

10. The system of claim 9, wherein the at least one computer processor is configured to use the market response model to determine an optimal price for the bid.

11. A non-transitory computer-readable medium containing executable code for creating shadow data to enhance a historical bid data set, the historical bid data set comprising a plurality of records, each record of the plurality of records representing a bid for business, that when executed by at least one computer processor causes the at least one computer processor to:

read a variable N, the variable N being a positive integer corresponding to a number of additional data records to be added for each record in the historical bid data set;

read a variable Delta, the variable Delta being a positive number corresponding to a percentage change in a price where each new data record is created; and for each record of the plurality of records:
        set a variable i equal to 0;
        set a variable P as an original price for a bid represented by the record; and
        loop N number of times, wherein for each loop:
            in response the bid being an accepted bid, modify the record to use a new variable P' as a new price that is based upon a new price ratio of (PR−i*Delta);
            in response to the bid being a rejected bid, modify the record to use a new variable P' as a new price that is based upon a new price ratio of (PR+i*Delta);
            store the modified record as a new record in the historical bid data set in the memory to form an enhanced historical bid data set; and
            add one to the variable i.

* * * * *